(12) United States Patent
Helie et al.

(10) Patent No.: US 7,405,733 B2
(45) Date of Patent: Jul. 29, 2008

(54) SPLINE DRAWING IN A COMPUTER-IMPLEMENTED GRAPHICS PROGRAM

(75) Inventors: Martin Helie, Laval (CA); Marc-André Davignon, Montreal (CA)

(73) Assignee: Autodesk Canada Co., Montreal, Quebec (CA)

( * ) Notice: Subject to any disclaimer, the term of this patent is extended or adjusted under 35 U.S.C. 154(b) by 86 days.

(21) Appl. No.: 11/088,507

(22) Filed: Mar. 24, 2005

(65) Prior Publication Data

US 2006/0214933 A1    Sep. 28, 2006

(51) Int. Cl.
   G06F 3/033   (2006.01)
   G06T 11/20   (2006.01)
   G09G 5/02    (2006.01)

(52) U.S. Cl. ........................ 345/442; 345/441; 345/157; 345/501; 345/619; 715/700; 715/856; 715/858; 715/253

(58) Field of Classification Search ......... 345/440–444, 345/156–160, 168, 172, 501, 522, 619–622; 715/211, 253, 255, 700, 726, 764, 785–786, 715/856–860; 382/181, 186, 201–203
See application file for complete search history.

(56) References Cited

U.S. PATENT DOCUMENTS

| 5,731,820 | A * | 3/1998 | Broekhuijsen | 345/442 |
| 6,111,588 | A * | 8/2000 | Newell | 345/442 |
| 6,549,205 | B1 * | 4/2003 | Horii et al. | 345/442 |
| 6,628,285 | B1 * | 9/2003 | Abeyta et al. | 345/441 |
| 6,628,295 | B2 * | 9/2003 | Wilensky | 345/594 |
| 2004/0252109 | A1 * | 12/2004 | Trent et al. | 345/174 |
| 2005/0089237 | A1 * | 4/2005 | Park et al. | 382/242 |
| 2006/0187216 | A1 * | 8/2006 | Trent et al. | 345/173 |

* cited by examiner

Primary Examiner—Wesner Sajous
(74) Attorney, Agent, or Firm—Gates & Cooper LLP

(57) ABSTRACT

A computer-implemented graphics program for drawing a spline. The spline is drawn using a first method in the graphics program. Thereafter, the graphics program seamlessly switches from drawing the spline using the first method to drawing the spline using a second method, in response to a first user command. Further, the graphics program may also seamlessly switch from drawing the spline using the second method to drawing the spline using the first method, in response to a second user command.

18 Claims, 7 Drawing Sheets

SPLINE DRAWING IN A COMPUTER-IMPLEMENTED GRAPHICS PROGRAM

BACKGROUND OF THE INVENTION

1. Field of the Invention

The present invention relates generally to computer-implemented graphics systems, and in particular, to a method, apparatus, and article of manufacture for improved spline drawing in a computer-implemented graphics program.

2. Description of the Related Art

Splines are free-form, smooth, irregular curves. Splines are used in computer-implemented graphics programs to represent lines, surfaces, edges, and other geometric shapes.

Typically, a spline is comprised of one or more curves connected by a series of vertices, which may or may not include control points. The vertices determine the location of the spline, while the control points contain the curve information for the spline. The curves in the splines can be reshaped by moving the vertices and/or control points. A fit tolerance can be used to control how closely the spline conforms to the vertices, wherein a low tolerance value causes the spline to form close to vertices and a tolerance of 0 (zero) forces the spline to pass through the vertices.

There is a need in the art for a way to generate splines that is more intuitive than current methods. There is also a need in the art for a way to quickly generate splines from the selection of vertices as well as by drawing the splines in freehand. There is also a need in the art to be able to quickly switch between the selection of vertices and the freehand drawing of splines. The present invention satisfies those needs.

SUMMARY OF THE INVENTION

To address the requirements described above, the present invention discloses a method, apparatus, and article of manufacture for drawing a spline in a computer-implemented graphics program. The spline is drawn using a first method in the graphics program. Thereafter, the graphics program seamlessly switches from drawing the spline using the first method to drawing the spline using a second method, in response to a first user command. Further, the graphics program may also seamlessly switch from drawing the spline using the second method to drawing the spline using the first method, in response to a second user command.

The first or second method may comprise a point-and-click method. The point-and-click method comprises selecting a cursor location and then placing a vertex for the spline at the cursor location.

The first or second method may also comprise a freehand method. The freehand method comprises selecting a cursor location and then dragging the cursor along a path, so that the spline follows the path, wherein one or more vertices are automatically placed on the path for the spline as the cursor is dragged. The automatically placed vertices are temporarily hidden, and the temporarily hidden vertices are only displayed when the freehand method is ended. Moreover, a number of vertices may be increased or decreased by adjusting a fit value.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
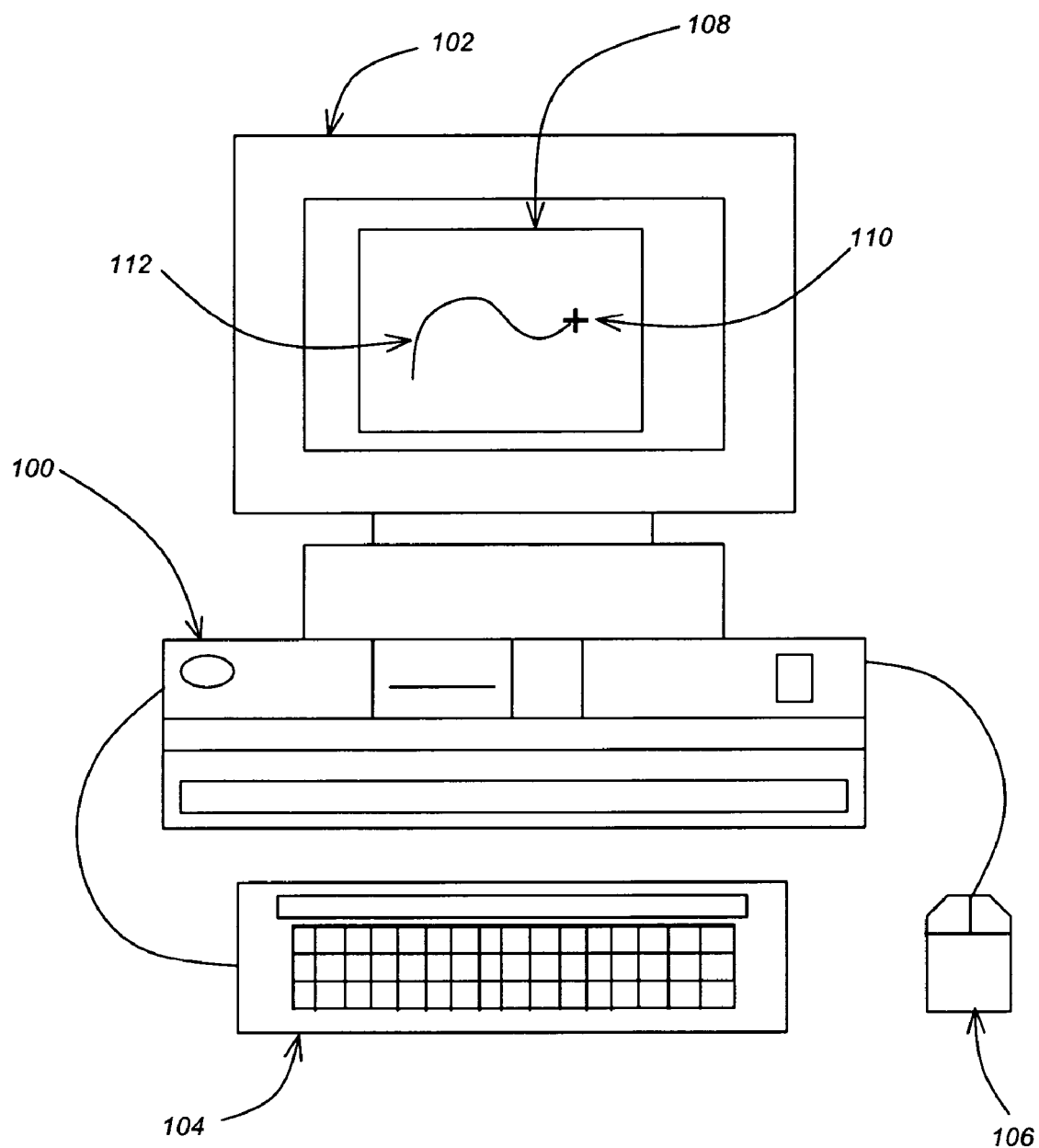
FIG. 1 is an exemplary hardware and software environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a monitor 102, a keyboard 104, a mouse 106, and other devices. Those skilled in the art will recognize that any combination of the above components, or any number of different components, peripherals, and other devices, may be used with the computer 100.

The preferred embodiment of the present invention is implemented by a computer-implemented graphics program 108 that is represented by a window displayed on the monitor 102. Within the program 108, the user controls a cursor 110 by operation of the keyboard 104 and/or mouse 106, and uses the cursor 110 to draw one or more splines 112 by seamlessly switching between alternative spline 112 drawing methods, as described in more detail below.

Generally, the program 108 comprises logic and/or data embodied in or readable from a device, media, or carrier, e.g., one or more fixed and/or removable data storage devices connected directly or indirectly to the computer 100, one or more remote devices coupled to the computer 100 via a data communications devices, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Operation of the Graphics Program

Within the program 108 window, spline 112 drawing may be initiated in a number of different ways, such as by selection of a menu item, a keyboard 104 command, a command line, etc.

Initially, spline 112 drawing is performed using a first method in the graphics program 108. Thereafter, the graphics program 108 seamlessly switches from drawing the spline 112 using the first method to drawing the spline 112 using a second method, in response to a first user command. Further, the graphics program 108 may also seamlessly switch from drawing the spline 112 using the second method to drawing the spline 112 using the first method, in response to a second user command.

Consider an example where the first method comprises a point-and-click method. The point-and-click method comprises selecting a cursor 110 location and then placing a vertex for the spline 112 at the cursor 110 location. For example, the point-and-click method may use the mouse 106 to select one or more vertices of a spline 112 by selecting a cursor 110 location with the mouse 106 and then clicking the mouse 106 button.

Assume that, in this example, the second method comprises a freehand method. The freehand method comprises selecting a cursor 110 location and then dragging the cursor 110 using the mouse 106 along a path, so that the spline 112 follows the path, wherein one or more vertices are automatically placed on the path for the spline 112 as the cursor 110 is dragged. The automatically placed vertices are temporarily hidden, and the temporarily hidden vertices are only displayed when the freehand method is ended. Moreover, the number of vertices may be increased or decreased by adjusting a fit value.

Assume also that, in this example, the first user command comprises the SHIFT key on the keyboard 104 being pressed, while the second user command comprises the SHIFT key on the keyboard 104 being released. Thus, so long as the SHIFT key remains depressed, the second method is used, but once the SHIFT key is released, the first method is used.

Thus, in this example, the SHIFT key on the keyboard 104 may be pressed, so that spline 112 drawing is performed in a freehand method (by selecting a cursor 110 location and dragging the cursor 110 using the mouse 106 while the mouse 106 button and SHIFT key remaining pressed). If the SHIFT key is released, the spline 112 drawing reverts to the point-and-click method. If the SHIFT key is pressed again, the spline 112 drawing reverts to the freehand method.

Of course, those skilled in the art will recognize that the first method may comprise the freehand method, while the second method comprises the point-and-click method. In addition, other methods of drawing splines may be used as well.

Finally, within the program 108 window, spline 112 drawing may be terminated in a number of different ways, such as by closure of the spline 112, or selection of a menu item, a keyboard 104 command, a command line, etc.

The ability of the present invention to allow the user to seamlessly alternate between spline 112 drawing methods is illustrated in more detail below.

Figure 2A:
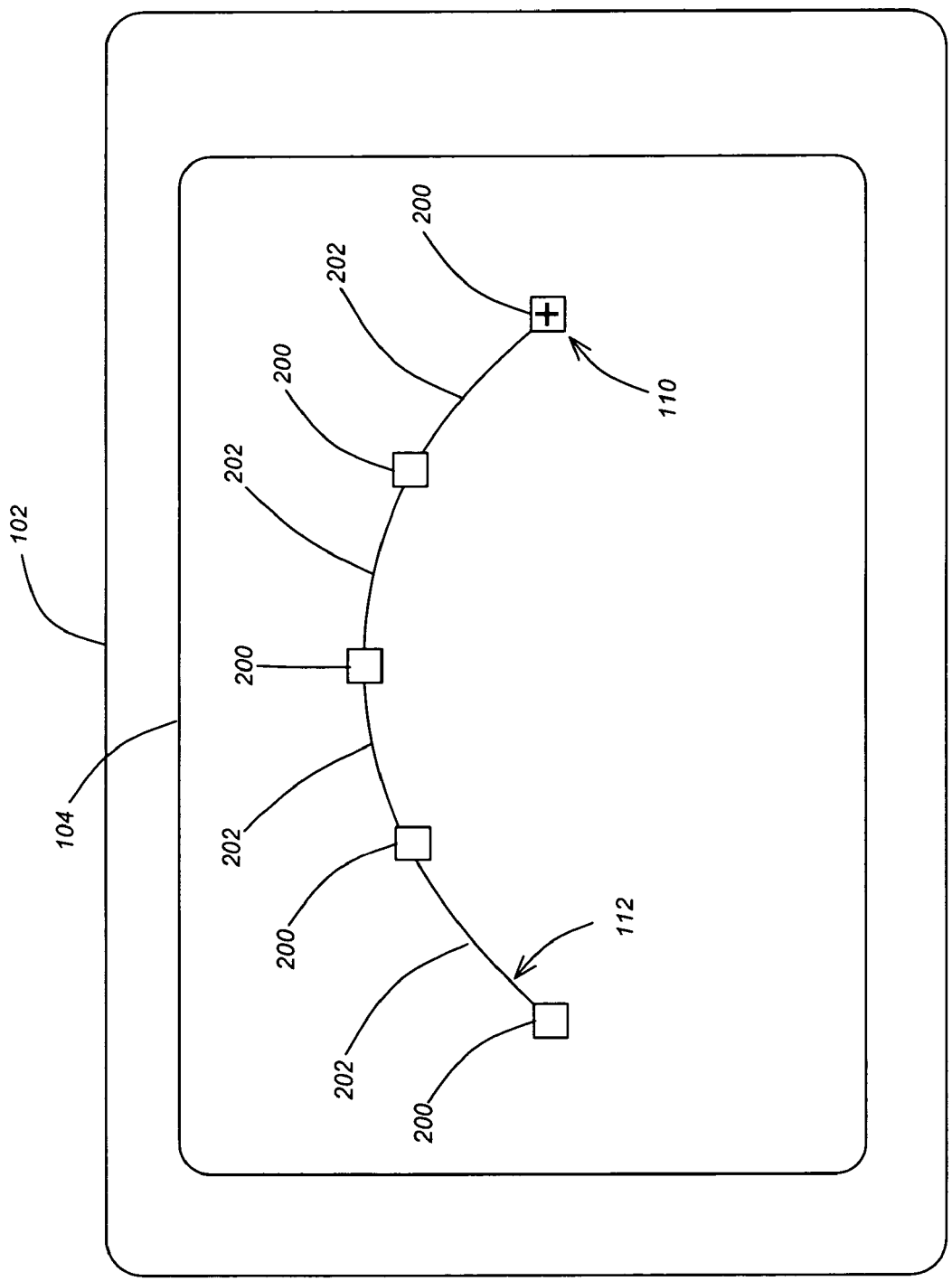
FIGS. 2A and 2B illustrate example displays of splines on a monitor according to the preferred embodiment of the present invention.

FIG. 2A illustrates the results when a user draws a spline 112 using the point-and-click method according to the preferred embodiment of the present invention. Each of the vertices 200 are added by user selection, i.e., by selecting the desired cursor 110 location and then clicking the mouse 106 button, wherein the program 108 generates the curves 202 of the spline 112 between the vertices 200. After the spline 112 is drawn, its vertices 200 can be edited as desired.

Figure 2B:
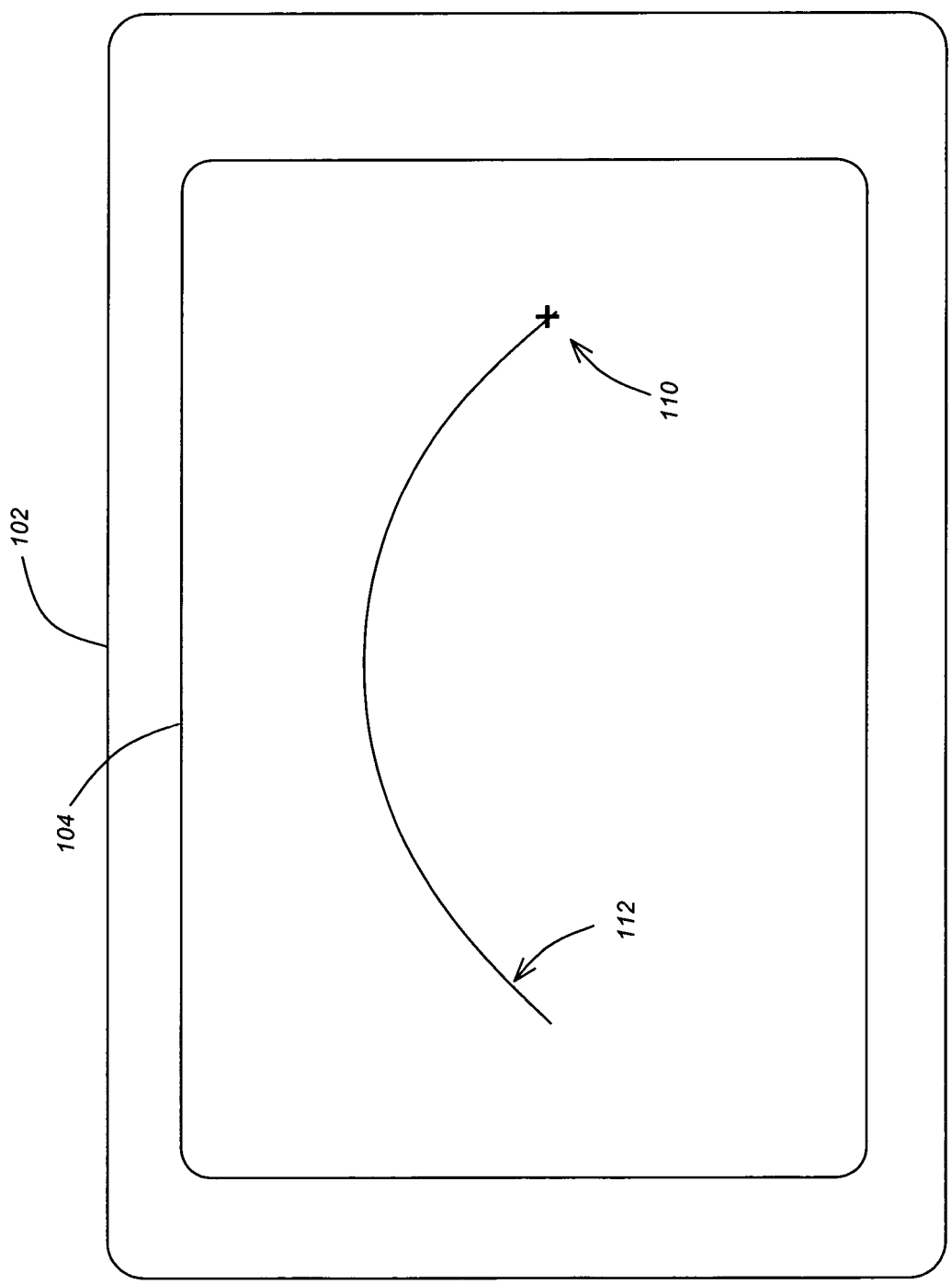

FIG. 2B illustrates the results when the user draws a spline 112 using the freehand method according to the preferred embodiment of the present invention. The user selects a cursor 110 location and then performs a SHIFT-drag operation by holding down both the mouse 106 button and the SHIFT key while dragging the cursor 110. As the cursor 110 is moved, freehand segments of the spline 112 are drawn by the program 108, with the vertices 200 of the spline 112 being automatically generated by the program 108, although the vertices 200 of the spline 112 are temporarily hidden. Vertices 200 are added where the user drags the cursor 110, and appear when the user releases the SHIFT key (at which point FIG. 2B would resemble FIG. 2A).

The user can increase or decrease the number of vertices 200 that define the freehand segments of the spline 112 by adjusting a fit value. An entire spline 112 may comprise freehand segments, in which case the fit value affects the whole spline 112. Otherwise, the fit value only affects the part of the spline 112 that were drawn in freehand.

To adjust the number of vertices 200 using the fit value, the user selects the spline 112 and specifies the fit value indicating the number pixels between vertices 200. The user increases the fit value in order to decrease the number of vertices 200 in the freehand segments of the spline 112, and the user decreases the fit value to increase the number of vertices 200 in the freehand segments of the spline 112. Only segments of the spline 112 that have been drawn freehand are affected, while segments created by the point-and-click method remain unaffected.

Logic of the Program

Flowcharts which illustrate the logic of the program 108 according to the preferred embodiment of the present invention are shown in FIGS. 3, 4, 5 and 6. Those skilled in the art will recognize that this logic is provided for illustrative purposes only and that different logic may be used to accomplish the same results.

Figure 3:
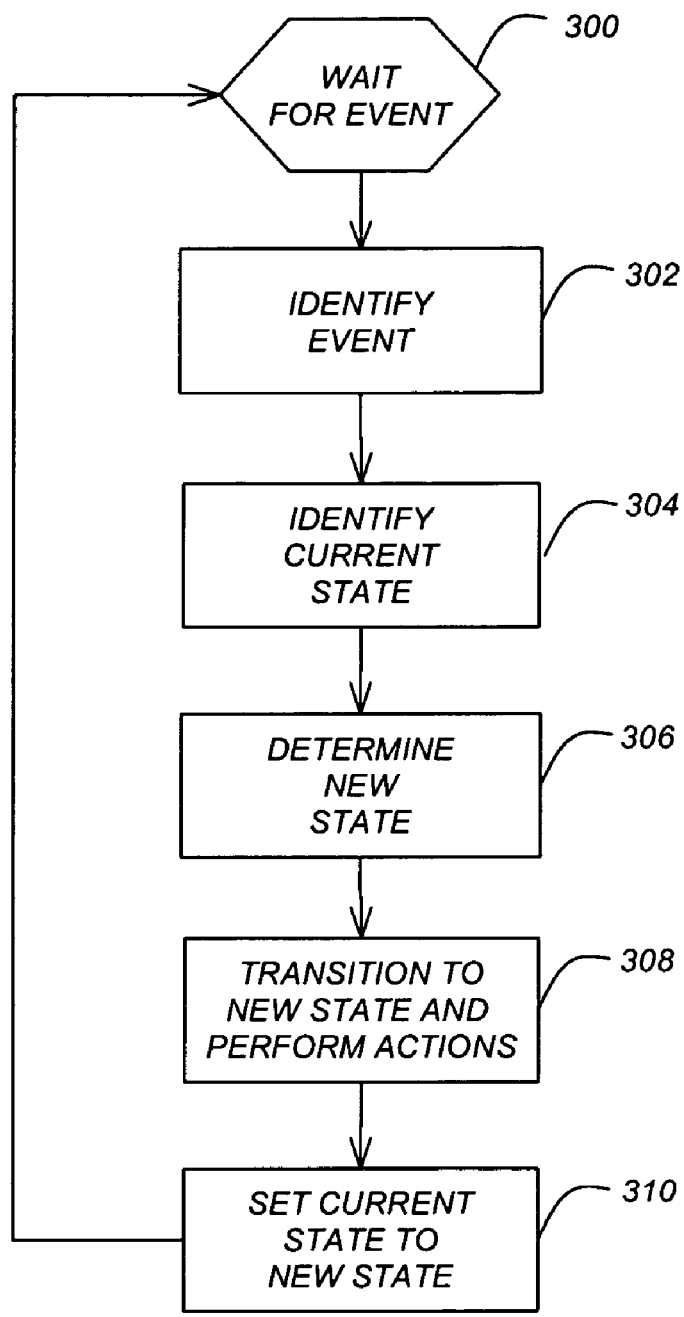
FIGS. 3, 4, 5 and 6 are flowcharts that illustrates the logic of the preferred embodiment of the present invention.

FIG. 3 is a flowchart that illustrates the general logic of a message or event-driven program 108 performing the steps of the preferred embodiment of the present invention. In such a program 108, operations are performed when transitions are made, based upon the receipt of messages or events, from present or current states to new states.

Generally, the flowchart begins by waiting at Block 300 for an event (e.g., the pressing of a keyboard 104 key or a mouse 106 button). It should be appreciated that, during this time, other tasks, e.g., file, memory, and video tasks, etc., may also be carried out. When an event occurs, control passes to Block 302 to identify the event. Based upon the event, as well as the current state of the program 108 determined in Block 304, a new state is determined in Block 306. In Block 308, the logic transitions to the new state and performs any actions required for the transition. In Block 310, the current state is set to the previously determined new state, and control returns to Block 300 to wait for more events.

The specific operations that are performed by Block 308 when transitioning between states will vary depending upon the current state and the event. The various operations required to implement and maintain the preferred embodiment of the present invention represent particular events handled by the logic. However, it should be appreciated that these operations represent merely a subset of all of the events handled by the computer 100.

Figure 4:
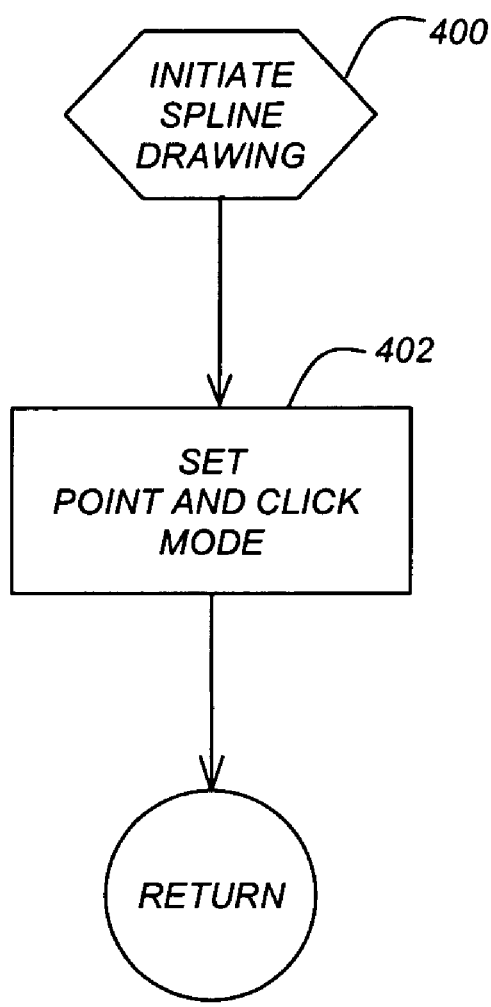

FIG. 4 is a flowchart that illustrates the logic that is performed when spline 112 drawing is initiated according to the preferred embodiment of the present invention.

The logic begins at Block 400 when spline 112 drawing is initiated by a user by means of a mouse 106 or keyboard 104 action, or by some other manner.

Block 402 represents the program 108 setting the spline 112 drawing mode to the point-and-click mode.

Thereafter, the logic ends.

Figure 5:
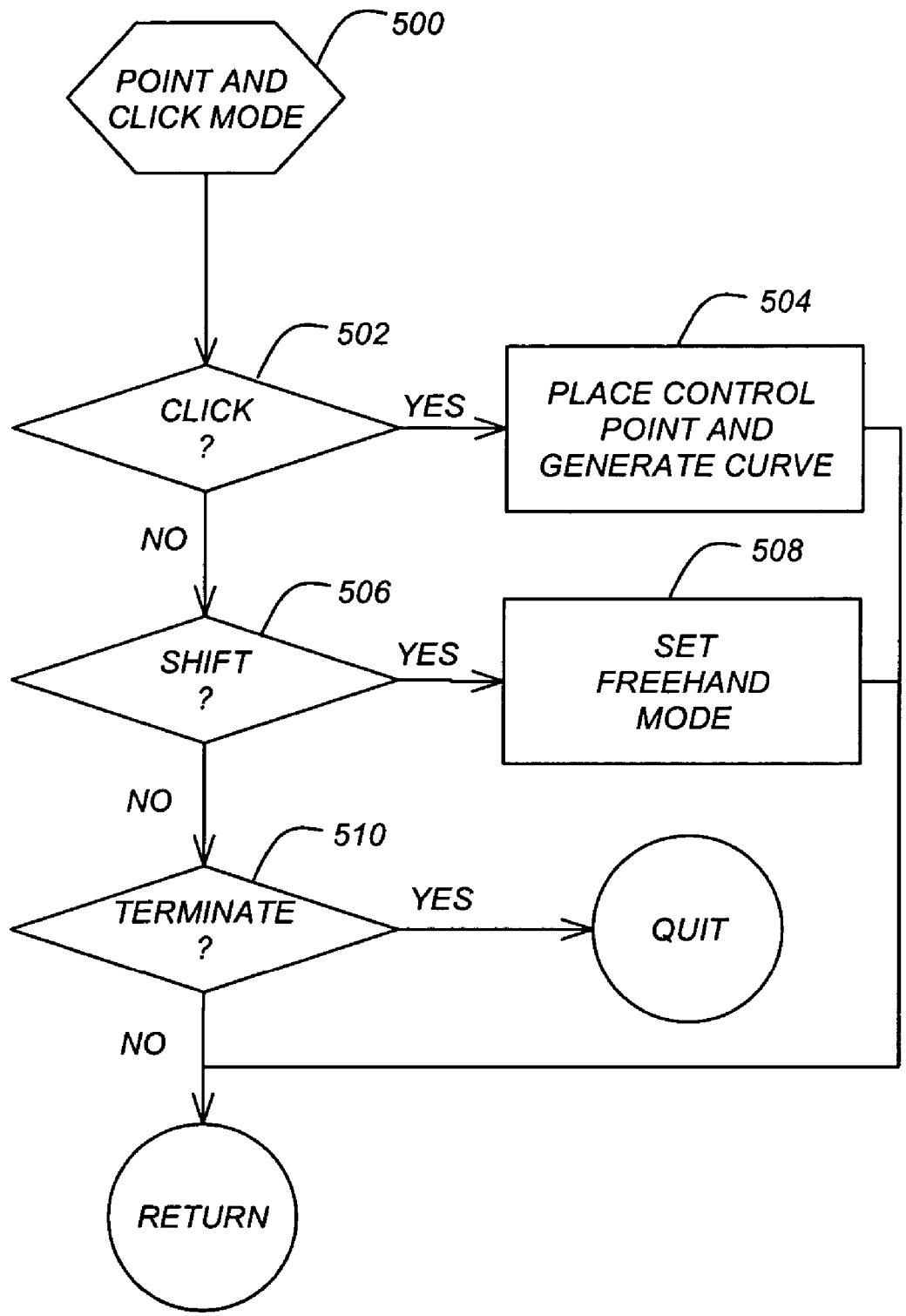

FIG. 5 is a flowchart that illustrates the logic that is performed when an event occurs while the program 108 is in point-and-click mode according to the preferred embodiment of the present invention.

The logic begins at Block 500 when event occurs selection within the program 108, such as an input by a user by means of a mouse 106 or keyboard 104 action, or by some other manner.

Block 502 is a decision block that represents the program 108 determining whether the event comprises a click of the mouse 106 button. If so, control transfers to Block 504; otherwise, control transfers to Block 506.

Block 504 represents the program 108 placing a vertex at the current cursor 110 location and generating a curve between the placed vertex and a previous vertex (if there exists a previous vertex). Thereafter, the logic ends.

Block 506 is a decision block that represents the program 108 determining whether the event comprises the pressing of the SHIFT key on the keyboard 104. If so, control transfers to Block 508; otherwise, control transfers to Block 510.

Block 508 represents the program 108 setting the spline drawing mode to the freehand mode. Thereafter, the logic ends.

Block 510 is a decision block that represents the program 108 determining whether the event comprises an indication to terminate spline 112 drawing. If so, then the program 108 quits the spline 112 drawing function.

Thereafter, the logic ends.

Figure 6:
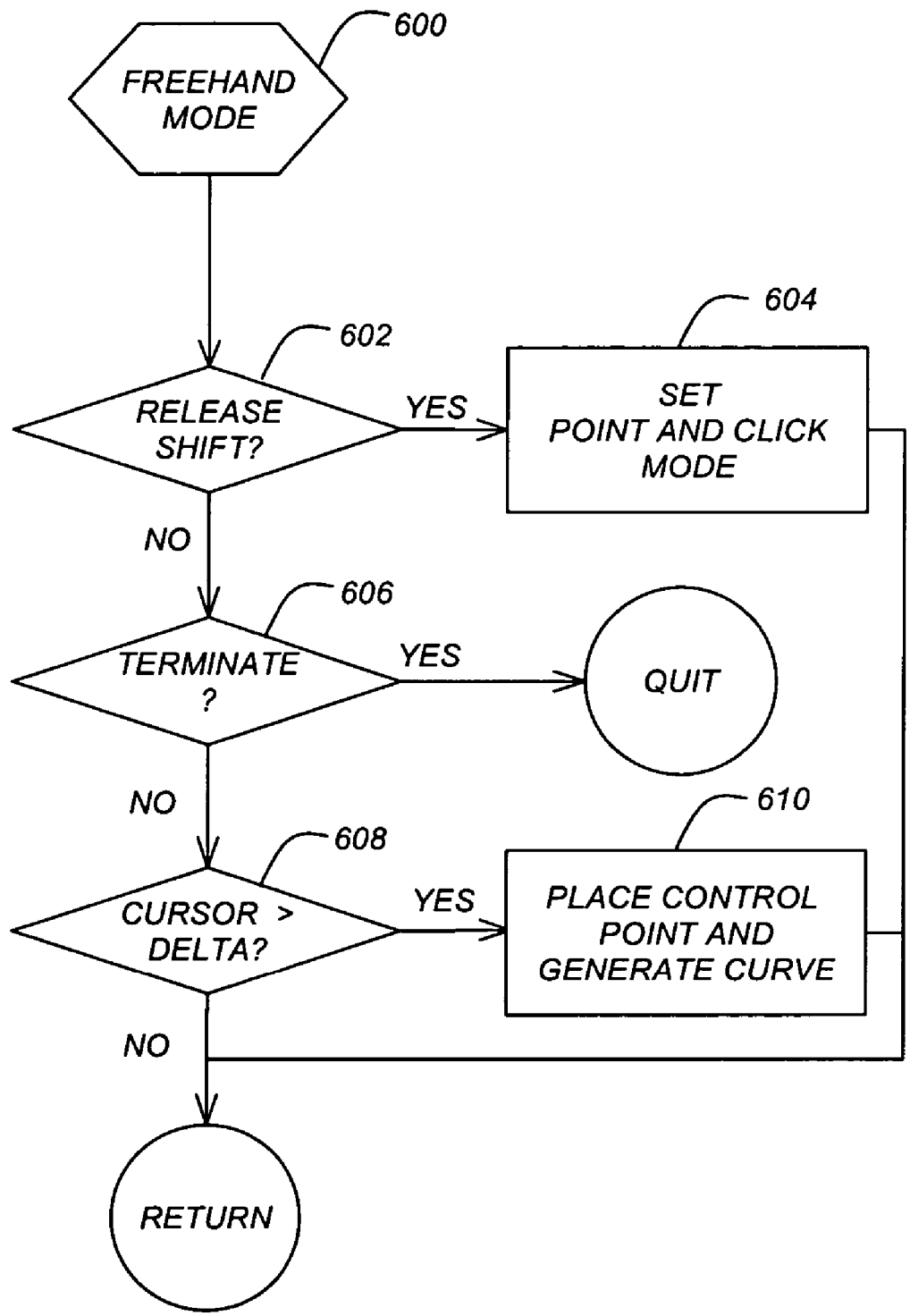

FIG. 6 is a flowchart that illustrates the logic that is performed when an event occurs while the program 108 is in freehand mode according to the preferred embodiment of the present invention.

The logic begins at Block 600 when event occurs within the program 108, such as an input by a user by means of a mouse 106 or keyboard 104 action, or by some other manner.

Block 602 is a decision block that represents the program 108 determining whether the event comprises the release of SHIFT key. If so, control transfers to Block 604; otherwise, control transfers to Block 606.

Block 604 represents the program 108 setting the spline 112 drawing mode to the point-and-click mode. Thereafter, the logic ends.

Block 606 is a decision block that represents the program 108 determining whether the event comprises an indication to terminate spline 112 drawing. If so, then the program 108 quits the spline 112 drawing function.

Block 608 is a decision block that represents the program 108 determining whether the cursor 110 location has been moved more than a "delta" amount. If so, control transfers to Block 610.

Block 610 represents the program 108 placing a vertex at the current cursor 110 location and generating a curve between the placed vertex and a previous vertex (if there exists a previous vertex).

Thereafter, the logic ends.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing a graphics capability could benefit from the present invention.

In summary, the present invention discloses a method, apparatus, and article of manufacture for drawing a spline in a computer-implemented graphics program. The spline is drawn using a first method in the graphics program. Thereafter, the graphics program seamlessly switches from drawing the spline using the first method to drawing the spline using a second method, in response to a user command. Further, the graphics program may also seamlessly switch from drawing the spline using the second method to drawing the spline using the first method in response to another user command.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for drawing a spline in a computer-implemented graphics program, comprising:
    (a) drawing the spline using a first method; and
    (b) seamlessly switching from drawing the spline using the first method to drawing the spline using a second method, without terminating the drawing of the spline, in response to a first user command;
    (c) wherein the first method comprises a point-and-click method and the second method comprises a freehand method, or wherein the first method comprises a freehand method and the second method comprises a point-and-click method;
    (d) wherein the point-and-click method comprises selecting a cursor location and then placing a vertex for the spline at the cursor location; and
    (e) wherein the freehand method comprises selecting a cursor location and then dragging the cursor along a path, so that the spline follows the path, wherein one or more vertices are automatically placed on the path for the spline as the cursor is dragged.

2. The method of claim 1, further comprising seamlessly switching from drawing the spline using the second method to drawing the spline using the first method in response to a second user command.

3. The method of claim 2, wherein the first user command comprises pressing a SHIFT key and the second user command comprises releasing the SHIFT key.

4. The method of claim 1, wherein the automatically placed vertices are temporarily hidden.

5. The method of claim 4, wherein the temporarily hidden vertices are displayed when the freehand method is ended.

6. The method of claim 1, wherein a number of vertices are increased or decreased by adjusting a fit value.

7. A computer-implemented apparatus for drawing a spline in a computer-implemented graphics program, comprising:
    a computer having a monitor attached thereto;
    logic, performed by the computer, for:
        (a) drawing the spline using a first method; and
        (b) seamlessly switching from drawing the spline using the first method to drawing the spline using a second method, without terminating the drawing of the spline, in response to a first user command;
        (c) wherein the first method comprises a point-and-click method and the second method comprises a freehand method, or wherein the first method comprises a freehand method and the second method comprises a point-and-click method;
        (d) wherein the point-and-click method comprises selecting a cursor location and then placing a vertex for the spline at the cursor location; and
        (e) wherein the freehand method comprises selecting a cursor location and then dragging the cursor along a path, so that the spline follows the path, wherein one or more vertices are automatically placed on the path for the spline as the cursor is dragged.

8. The apparatus of claim 7, further comprising logic for seamlessly switching from drawing the spline using the second method to drawing the spline using the first method in response to a second user command.

9. The apparatus of claim 7, wherein the first user command comprises pressing a SHIFT key and the second user command comprises releasing the SHIFT key.

10. The apparatus of claim 7, it wherein the automatically placed vertices are temporarily hidden.

11. The apparatus of claim 10, wherein the temporarily hidden vertices are displayed when the freehand method is ended.

12. The apparatus of claim 7, wherein a number of vertices are increased at decreased by adjusting a fit value.

13. An article of manufacture comprising a computer program storage device storing instructions that, when read and executed by a computer, results in the computer performing a method for drawing a spline, the method comprising:

(a) drawing the spline using a first method; and (b) seamlessly switching from drawing the spline using the first method to drawing the spline using a second method, without terminating the drawing of the spline, in response to a first user command;

(c) wherein the first method comprises a point-and-click method and the second method comprises a freehand method, or wherein the first method comprises a freehand method and the second method comprises a point-and-click method;

(d) wherein the point-and-click method comprises selecting a cursor location and then placing a vertex for the spline at the cursor location; and (e) wherein freehand method comprises selecting a cursor location and then dragging the cursor along a path, so that the spline follows the path, wherein one or more vertices are automatically placed one the path for the spline as the cursor is dragged.

14. The article of claim 13, further comprising seamlessly switching from drawing the spline using the second method to drawing the spline using the first method in response to a second user command.

15. The article of claim 13, wherein the first user command comprises pressing a SHIFT key and the second user command comprises releasing the SHIFT key.

16. The article of claim 13, wherein the automatically placed vertices are temporarily hidden.

17. The article of claim 16, wherein the temporarily hidden vertices are displayed when the freehand method is ended.

18. The article of claim 13, wherein a number of vertices are increased or decreased by adjusting a fit value.

* * * * *